Patented Apr. 18, 1950

2,504,869

UNITED STATES PATENT OFFICE 2,504,869

FROZEN FOOD IMPROVEMENTS

Harry A. Noyes, Watertown, Mass.

No Drawing. Application March 7, 1946,
Serial No. 652,796

8 Claims. (Cl. 99—192)

This invention refers to developments in connection with the food preserving industry and my United States Patent No. 2,317,397 issued in 1943 entitled "Process of conditioning foods."

The objective of this invention is to give methods for making improved frozen products such as stews and particularly cooked food-stuffs. As an example of the difficulties existing in the industry at the present time it is pointed out that it would not be advisable to can together piccalilli, veal and beans because while many people enjoy the particular flavors of piccalilli with baked beans, those particular flavors would be lost when the beans were packed and then canned with the piccalilli as the product would age to be one flavor. This is in contradiction to the fact that many combinations of food and many high class mixtures such as stews and chowders are very tasty if served and eaten shortly after they have been cooked and prepared.

Changes in the flavor of mixtures of foods take place much more slowly when mixtures are rapidly cooled and quick frozen after they are made. Eventually, however, the individual tastes mix and the consumer misses the characteristic flavors of the parts that make up the whole. An example of the present invention is in the making of beef stew which is cooked, frozen and sold as a cooked frozen product. It is customary and usual procedure for the different vegetables, meat, and other materials in the stew to be prepared and cooked together, after which the whole is cooled more or less, packaged, quick frozen, and held frozen until some method of defrosting is employed by the individual who prepares the stew for the table. A variation in the above procedure may take into account differences in cooking time required for the various constituents by adding the particular vegetable or constituent which cooks in the shortest time near the end of the cooking. I find that the above procedures can yield very tasty and delicious products, but also find that the longer the stew is held even in the frozen state the more chance there is of the taste of all parts of the stew becoming the same and, therefore, much of the enjoyment of eating is lost.

This invention therefore relies on the fact that changes occur while the stew is being held frozen according to the working of the principles described in my food conditioning Patent No. 2,317,397 referred to above. I therefore cook either one or all the main bulky constituents and freeze them as individual units, usually employing quick freezing. The frozen units are stored individually or mixed together between preparation and the putting together of the ultimate food products in the proportions required for the manufactured product. As an example, turnips, carrots and potatoes, etc., as 3 constituents of beef stew would be prepared in suitable pieces cooked and frozen separately after which a specific number of ounces of the carrots or equal weight of the frozen potato pieces and specific weight of the frozen turnip pieces, etc., would be mixed in the proportions desired for the finished product. These frozen pieces would to put, for example, in the package that is to contain the frozen stew in the frozen condition, and then the cooked meat with the liquid, sauce, seasoning, etc., cooled to its desired point would be added to the frozen units after which the whole would be frozen and stored in the frozen state.

Vegetables, meat and mixtures of different constituents usually give up part of their flavors and take on flavors of other foods during frozen storage. I make variations in my methods of mixing and select materials that are to be frozen or frozen and mixed together in the frozen state ahead of time with the ultimate flavor desired predeterminated in a large measure.

It is desirable that all such products undergo a certain amount of mixing of flavors and the temperature at which the sauce and other constituents are poured over the frozen units takes care of this by melting more or less of the outside of the individual units in bringing the temperature of the added material to the freezing point. Holding at lowered temperatures for periods also is used to control ultimate flavor. This mixing of flavors can be controlled and is, by temperature of constituents in many cases the principal agent in producing the ultimate tasty product. According to my procedure the size of the individual units and the control of temperatures makes it possible for the distinct flavor of, for example, carrots to be present in the center of the individual piece at the time the product is consumed.

Another example of my invention is to make frozen fruit mixtures and frozen fruit and vegetable mixtures by a procedure whereby each of the individual fruits or vegetables are frozen as individual units of either whole fruits or vegetables or cut fruits and/or vegetables. The individual pieces are then coated by sugar solution, or other solutions, as they will be if frozen by the liquid contact process described in my patent application 482,611 now Patent No. 2,482,202. These pieces are then packed in containers and the interspaces filled with liquid and juice that is cold yet above its freezing point following which the whole are quick frozen together. During freezer storage there will be frozen partitions consisting of frozen solution between the frozen fruit or vegetable pieces. The packing is to be so carried out and the temperatures of all held low enough during frozen storage so that there is no migration of flavors from one unit to another that is detrimental to the eating qualities of the product. This product can be, for example, colored fruits and white fruits together. It can also be a mixture of vegetables, a mixture of fruits, as well as mixtures of fruits and vegetables indicated above.

Yet another example of this invention is the freezing of individual units or pieces of foodstuff, then coating the individual units with ice. The new step is to depend on the coating of ice over the individual piece of food and the two purposes served operate together or singly; namely: (1) The latent heat of melting of the layer of ice cools the liquid put in to fill the interstices so as to prevent too great defrosting of individual units, and (2) the coating of ice is kept as a wall to separate one kind of unit of foodstuff from another and makes the action of the liquid filling the interstices vary from nothing during short periods of time of frozen storage to slow conditioning during longer periods of storage.

Instead of water which freezes on the frozen constituents to further protect them this invention includes liquids that are principally of constituents that are principally other than water as, for example, butter, beef fat, chicken fat, etc., which cool and harden to give a surface that has protective characteristics from substances in water solution.

Another example in the carrying out of this invention is the handling of materials to be used in preparing cooked frozen beef stew. These may include beef, peas, carrots, celery, potatoes, onions, and turnips. The peas are prepared, cooked and frozen as individual pieces which happen to be whole units in this case, while the individual units of carrots, potatoes and turnips frozen are parts of individual vegetables. The carrots would be washed, scraped, cooked, diced and frozen. The handling of the turnips and potatoes would be generally similar to the carrots but often it is advantageous to cut the vegetables some before cooking. The other prepared materials may be cooked together with water or extracts obtained in cooking the other vegetables. The liquid stock and the materials therein would then be cooled and placed in the containers in which the stew is to be frozen. The other prepared and frozen materials are then added and the freezing of the whole is then completed without any considerable defrosting of the same.

What I claim and desire to secure by Letters Patent is:

1. The process of making a cooked frozen product from several food constituents comprising separately preparing and cooking the constituents in usual sized pieces and liquids, separately quick freezing one or more of the cooked prepared constituents and then further protecting the retention of flavors and tastes of the frozen pieces previous to combining with the other constituents for quick freezing by coating said frozen constituents with a coating of ice.

2. The process of claim 1 when frozen constituents are covered with an edible solid that is principally other than water in its content.

3. The method of preparing frozen cooked products containing a number of different ingredients with preservation of distinctive flavors of individual ingredients, which comprises cooking and freezing different ingredients as individual units separately, placing the frozen units together with liquid in a container, and freezing the contents of such container.

4. The method of preparing a frozen cooked stew containing vegetables, meat and sauce, which comprises separately cooking and freezing the different vegetable constituents of the stew, separately cooking meat and preparing a liquid sauce therefor, placing the frozen vegetable units, cooked meat and liquid sauce together in a container, and quick freezing the mingled mass of ingredients.

5. The method of preparing a frozen fruit mixture, which comprises separately freezing pieces of different fruits, placing the frozen fruit pieces in a container with cold liquid, and quick freezing the whole mass of pieces and liquid.

6. The method of preparing a frozen food product containing a plurality of different ingredients, which comprises separately freezing individual units of such different foodstuffs, coating the frozen units with ice, placing the frozen units in a container, pouring into the container around the ice coated units a liquid of which the temperature and heat absorbing capacity are insufficient to cause defrosting of the frozen units, and extracting heat from the mixture to quick freeze the liquid.

7. A process of making frozen products from a mixture of foodstuffs comprising separately freezing individual water containing constituents of the mixture, assembling the separately frozen constituents, adding to such assemblage cooled liquid at a temperature at least as low as about 50 degrees Fahrenheit, and quick freezing the assembled product, whereby the flavors of the several constituents are retained more effectively in the individual constituents than occurs when all are combined before freezing.

8. The process set forth in claim 7, together with the further step of holding the frozen product in cold storage at temperatures lower than plus 10 degrees Fahrenheit.

HARRY A. NOYES.

REFERENCES CITED

The following references are of record in the file of this patent:

UNITED STATES PATENTS

| Number | Name | Date |
|---|---|---|
| 1,896,529 | Tressler | Feb. 7, 1933 |
| 2,248,289 | Thal | July 8, 1941 |